United States Patent [19]

Litchfield

[11] 4,157,119
[45] Jun. 5, 1979

[54] MANUAL GRADING TOOL

[76] Inventor: Everett S. Litchfield, 650-251 S. Rancho Santa Fe Rd., San Marcos, Calif. 92069

[21] Appl. No.: 817,178

[22] Filed: Jul. 20, 1977

[51] Int. Cl.² .............................................. A01B 1/20
[52] U.S. Cl. .................................... 172/375; 172/611
[58] Field of Search ............. 172/371, 375, 611, 378, 172/379, 380; 56/400.04, 400.05, 400.06, 400.14, 400.15; 111/7.1, 7.2; 404/133; 7/1 L, 14.4, 14.55; D8/2, 6, 13

[56] References Cited

U.S. PATENT DOCUMENTS

| 1,209,072 | 12/1916 | Temte | 56/400.05 |
| 2,076,120 | 4/1937 | Cyganick | 172/375 |
| 3,091,197 | 5/1963 | Henry | 111/7.1 |
| 3,143,984 | 8/1964 | Morasch | 111/7.1 |

FOREIGN PATENT DOCUMENTS

| 163110 | 5/1949 | Austria | 56/400.04 |
| 1370387 | 7/1964 | France | 172/378 |
| 26793 | 5/1909 | Sweden | 56/400.05 |
| 172632 | 1/1935 | Switzerland | 56/400.05 |
| 724232 | 2/1955 | United Kingdom | 172/375 |

Primary Examiner—Richard T. Stouffer
Attorney, Agent, or Firm—Tom Sherrard

[57] ABSTRACT

A combination tool having teeth on one side for both loosening and raking soil or material on the surface of ground and having on its opposite side a portion with a substantially flat bottom for smoothing such soil or material in a manual trowel-like action.

1 Claim, 6 Drawing Figures

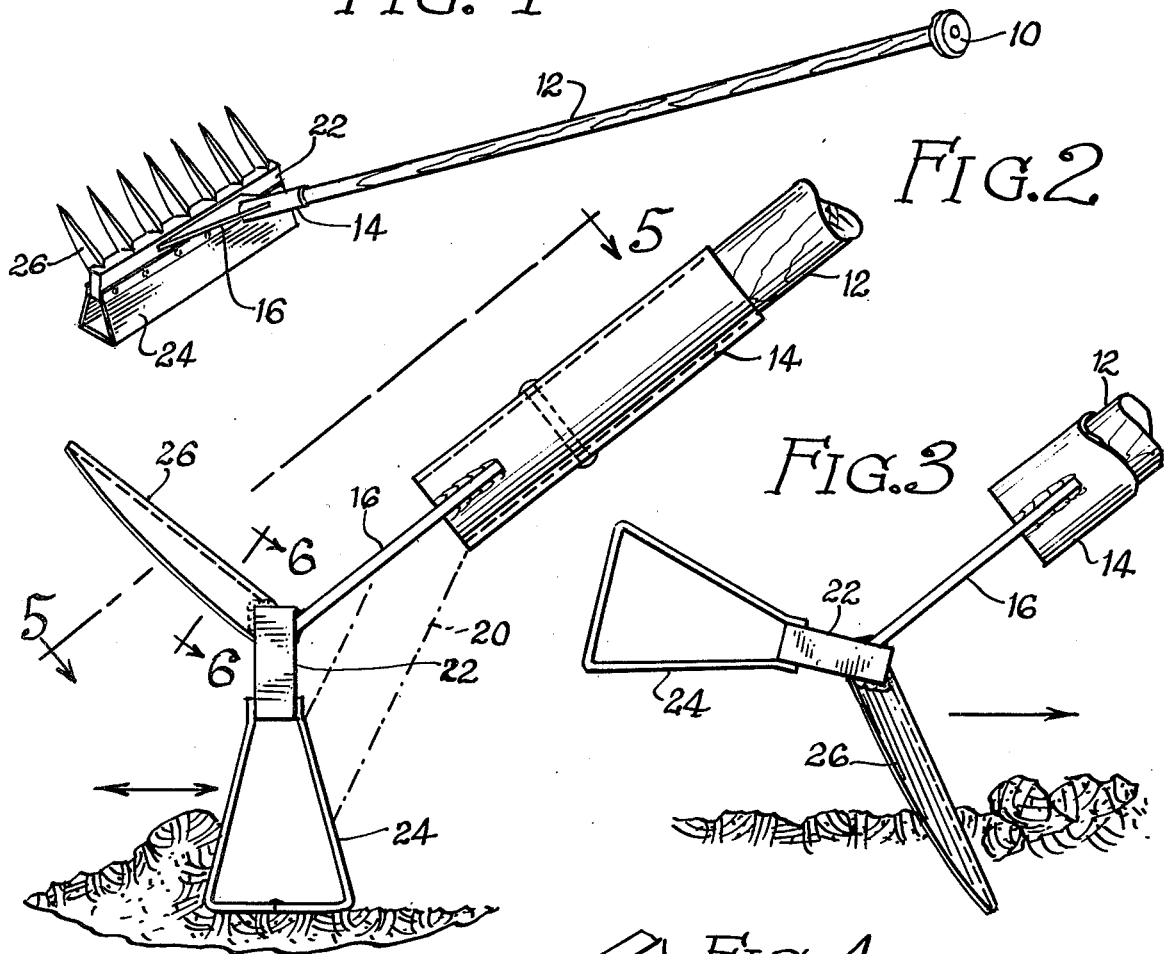
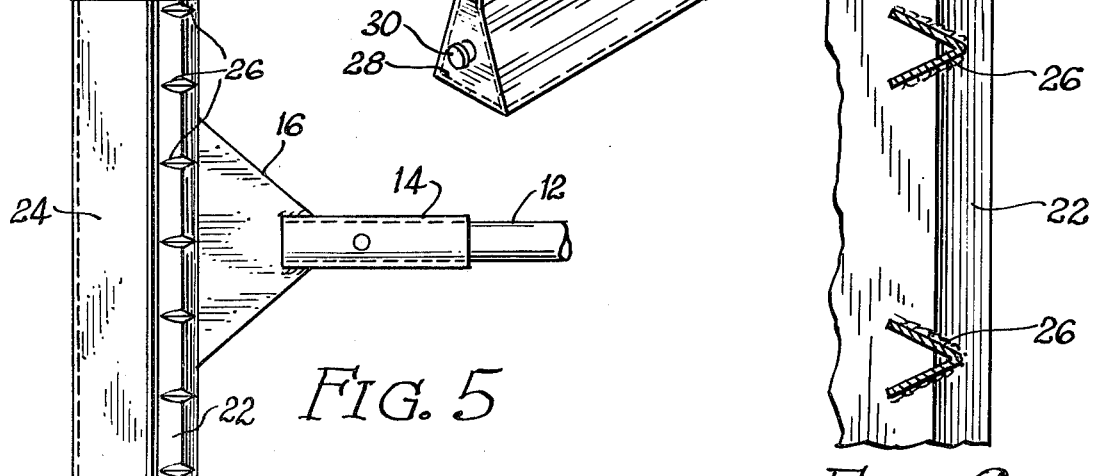

MANUAL GRADING TOOL

BACKGROUND OF THE INVENTION

As is well known to persons doing landscape and grading work, it is desirable to simply and expediently manipulate ground material without resort to expensive machinery and skilled labor. It is not uncommon for conditions to exist that, heretofore, required extensive manipulation and treatment by more than one tool before ground has been converted from its rough, undesirable condition to a smooth, attractive usable condition with or without contours as may be desired.

Recognizing the problems, others have attempted to devise combination tools for accomplishing the desired result but without success. Particular reference is to U.S. Pat. Nos. 534,279, and 2,225,108. Both patents feature a handle having tines or teeth at one end for a raking action with a roller secured to a common base with the teeth projecting in the opposite direction. By providing rollers, these tools are merely weak rakes, with means for compacting (by rolling) the soil. In other words the tools in these patent disclosures will, inadequately, loosen ground with the teeth action of the rake portion, and then, by turning the tool 180°, permit the operator to again compact the ground with the roller portion without any means to level, smooth or, if desired, change the contour of the ground between these two operations. The rollers have no weight or authority to move ground because they would roll up on any accumulation. The prior art is limited to lightly compacting soil which has been leveled and smoothed by other means. Other shortcomings of the prior art will appear from the description of my improved device.

Before my invention there has not been one simple manually operated tool which could be used to do any or all of the following: loosening surface soil; light dirt moving; grading small areas; removing clods; forming and preparing garden plots; laying out walk ways; laying out drainage courses; preparing flower beds; laying out patio areas preparatory to providing stepping stones or cement; raking heavy trash and filling ditches or other low areas.

SUMMARY

By providing a substantial bar portion at one end of a handle with unique tines projecting at an optimum angle therefrom, together with a smoothing portion with a flatened surface also projecting from the bar, but oppositely disposed to tines, I have provided a tool with which a person can easily and simply perform the functions itemized in the foregoing paragraph.

BRIEF DESCRIPTION OF DRAWING

In the drawings forming a part hereof:

FIG. 1 is a perspective view of the preferred embodiment of my invention.

FIG. 2 is a side elevation thereof showing it being used to smooth ground.

FIG. 3 is a side elevation thereof showing it being used to loosen ground.

FIG. 4 is a perspective view of a modification of the ground smoothing portion.

FIG. 5 is a top plan view of the device taken along line 5—5 of FIG. 2.

FIG. 6 is a top plan view of the device taken along line 6—6 of FIG. 2.

DESCRIPTION OF PREFERRED EMBODIMENT

In the accompanying drawings wherein like reference numerals indicate the same parts throughout, the numeral 12 depicts a handle for manually using the tool. It is cylindrical in configuration and of heavy duty construction and made of wood or metal. At one end I have provided an oval shaped portion 10 for good hand contact and force application while pushing or pulling on the handle. Proximate to the opposite end of the handle I have provided a collar or sleeve 14 to strengthen the connection between the handle and remainder of the tool. The end of the handle fits snugly into the sleeve and is secured by a bolt through the sleeve and handle. Being metal it permits a weld connection to metal triangular plate 16 as illustrated. This plate is slotted at and near the apex of the angle which contacts the sleeve on the end of the handle to increase the area of contact between the two parts.

An important feature of my improved tool is crossbar 22. It is central to the entire assembly and provides the basis for weight, durability and strength required for rugged use. It is preferably of solid metal construction and of elongated rectangular configuration. The base of plate 16 is welded along the middle side of the bar at an optimum angle for use by the average sized person. See FIG. 3 of the drawing. An additional strut or brace 20 as shown in FIG. 5 may be added between the plate and the later described smoothing member 24, if desired.

Next I have provided a plurality of blades or tines 26. They are preferably seven in number uniformily along one edge of a cross-bar having a length of 12 inches. They are preferably formed of steel and have v-shaped transverse configuration for maximum strength and weld contact with bar 22. Referring to FIG. 5, it can be seen that, by notching the base of each tine, contact is made between the tine and cross-bar on two surfaces (a side and edge) of the cross-bar. Again, this maximizes the area for welding the two parts together.

A final unique important feature of my device is smoothing member 24. It has flat sides that slope toward each other at their open upper ends. As can be seen in the drawing these upper ends are secured, by welding or bolting, along the sides of the cross-bar. The ends of the sides are bent slightly outward for abutting the bar. Attention is directed to the important discovery that the base of member 24 is substantially flat. It is parallel to and several times wider than the edge of the bar that is nearest the ground when in position for use. Experience shows that this flat base permits the tool to move material on the ground, or ground itself, loosened by the tines, most ideally. By either pulling or pushing the tool, the material is moved by the described sides, as shown in FIG. 2 of the drawing, and the surface of the ground under the flat base of member 24 thereby becomes smooth. On the other hand, if the material contacting surface were tubular or a roller (as in the prior art), it would tend to cause the tool to go up over the material without smoothing it. Also, the flat surface permits the operator to use the tool in a pounding act to break larger clods of earth material into smaller ones.

As an option, the interior of member 24 can be sealed and the ends provided with closed surfaces. A port 30 may be provided so that the chamber thus formed can be filled with water for added weight when desired.

In manufacture, the smoothing member can be stamped out of 14 gauge steel in two identical half sections with a seam weld along the middle of the flat surface at the bottom.

Finally, attention is directed to the angulation between the important parts. See FIG. 3 of the drawing. I find that the relative positions of the described parts on the cross-bar should best be such that there is an angle of about 38 degrees between the handle and the surface of the ground when the tool is used by a person of the average height. This, together with tine placement as illustrated, permits the teeth to naturally dig into the ground, and also, it permits the member 24 to move the earth or other material simply by rotating the tool 180 degrees. A change in the elevation of the handle is not needed.

Those skilled in the art may make certain changes which will fall within the scope of the subjoined claims without departing from my invention.

I claim:

1. In a landscraping and grading tool the combination of:
   (a) An elongated handle suitable for manual use while the operator stands in an upright position,
   (b) An enlarged portion integral with and positioned at the end of the handle and of such construction that the hands and abdomen of the operator may abut same when applying force to the device,
   (c) A base member being a flat, rectangular, bottom portion suitable for contacting the ground and two oppositely disposed substantially vertical side portions integral therewith and extending upwardly therefrom, said base member having a smooth, rounded juncture between the bottom portion and the side portions extending along the entire edge of each side of the bottom portion which broders a side portion and the corresponding bottom edge of each side portion wherein the sides slope inwardly towards each other forming an angle of approximately fifteen (15) degrees in respect to a line perpendicular to the bottom portion, and wherein the height of the side portions is about one and one half times the lateral width of the bottom portion,
   (d) A plurality of blades suitable for harrowing the ground, and,
   (e) Connecting means secured to the end of the handle opposite that of the enlarged portion and which means retains both the base member and the blades in such space relationship with each other that an operator can cause, alternately, the base member and the blades to contact the ground for comfortable and effective use simply by manually rotating the handle.

* * * * *